INVENTOR.
Jerome H. Lemelson

United States Patent Office 3,743,493
Patented July 3, 1973

3,743,493
METHOD OF MAKING A DUCTED SHEET
ASSEMBLY AND COMPOSITE ARTICLE
Jerome H. Lemelson, 85 Rector St.,
Metuchen, N.J. 08840
Continuation of application Ser. No. 780,801, Dec. 3, 1968, now abandoned, which is a continuation-in-part of application Ser. No. 432,033, Nov. 25, 1964, now Patent No. 3,414,863, which in turn is a continuation-in-part of application Ser. No. 589,848, May 28, 1956, now Patent No. 3,166,829. This application Sept. 27, 1971, Ser. No. 184,298
Int. Cl. C03b 23/02
U.S. Cl. 65—54                                5 Claims

ABSTRACT OF THE DISCLOSURE

A method for producing a composite ducted sheet or panel as provided and a new and improved article of manufacture producted by said method. The method involves the expansion of selected portions of a sheet or panel assembly while they are at elevated temperature and in an easily expandable condition to provide a duct for conduit portion or portions of said sheet or panel which may serve to conduct or retain certain fluids such as gases therein. In one form, the sheet or panel is made of a ceramic material such as glass or silica which is provided at its softening temperature and is expanded with one or more vein-like duct formations therein either in a mold or without the benefit of a mold whereby expansion is controlled by control of the fluid pressure and/or the temperature of the material. The invention is also directed to new and improved articles of manufacture produced by the methods described including electrical signs of the neon or argon type.

RELATED APPLICATIONS

Figure 1:
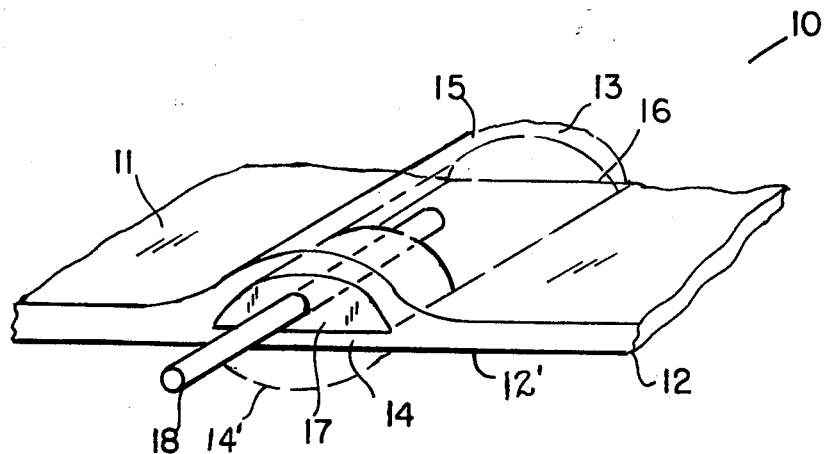

This application is a continuation of application Ser. No. 780,801, filed Dec. 3, 1968, now abandoned which is a continuation-in-part of application Ser. No. 432,033 filed Nov. 25, 1964, now U.S. Pat. 341,863 which is a continuation-in-part of application Ser. No. 589,848 filed May 28, 1956, now U.S. Pat. 3,166,829.

SUMMARY OF THE INVENTION

This invention relates to a method for producing ducted panels and new and improved panel structures produced thereby. In particular, the invention relates to a method for producing a panel containing bone or more vein-like duct formations formed in a composite sheet material by heat softening either the entire panel or selected portions thereof to be expanded after which a fluid, preferably, although not necessarily, a gas is introduced into flat strip-like passageways in the softened material to expand same outwardly to form one or more conduits in the sheet or panel defining said vein-like ducts. Reference is made to said parent applications from which the instant application depends for details of forming such panels or ducted sheets of metal, glass or other ceramic materials and for means for encapsulating a fluid liquid, gas or solid formed or injected in the fluid state into the panel passageway either before or after forming same to an expanded shape.

In the instant invention, two sheets of glass or other suitable clear ceramic material may be roll bonded or fused together save in certain areas thereof to define the duct like formations and, either while at elevated temperature attained to effect the roll bonding or fusing of the sheets or by the reapplication of heat thereto after the sheets have been bonded into a single sheet or panel, a gas or hot liquid is injected into said non-fused certain areas to outwardly expand either or both portions of the walls of said certain areas to form expanded vein-like ducts in the sheet material. The vein-like duct formations so formed may be evacuated of air and sealed or filled with an inert gas or a gas such as neon or argon and sealed after insertion of suitable electrodes for conducting electrical energy to the gas in the duct to cause fluorescence or other form of light emission for lighting and display purposes. The conventional technique of forming a lighted neon sign type of display requiring the bending and assembly of a plurality of glass tubes and the support of said tubes is thus greatly simplified. Accordingly, it is a primary object of the instant invention to provide a new and improved method for forming ducted panelling and articles made thereby such as display signs, lamps and the like.

Another object is to provide a new and improved duct or chamber portions by electively and controllably method for forming improved panels with distended duct or chamber portions by selectively and controllably heating composite sheet material so as to soften same to permit its expansion and thereafter selectively expanding same.

Another object is to provide new and improved panel structures which may be used to fabricate electrical displays such as neon signs and the like without the need for assembling and forming glass tubing.

Another object is to provide an improved structure in an electrically conducting panel containing a fluid such as a conducting or semi-conducting liquid or glass entrapped therein.

With the above and such other objects in view as may hereafter more fully appear, the invention consists of the novel constructions, combinations, arrangements of parts and methods as will be more fully described and illustrated in the accompanying drawings, but it is to be understood that changes, variations and modifications may be resorted to which fall within the scope of the invention as claimed.

Figure 2:
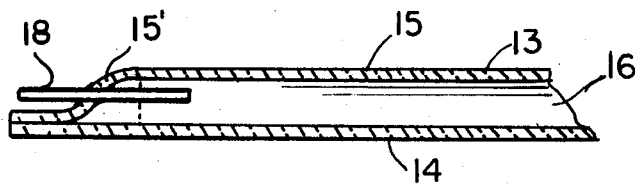
Figure 3:
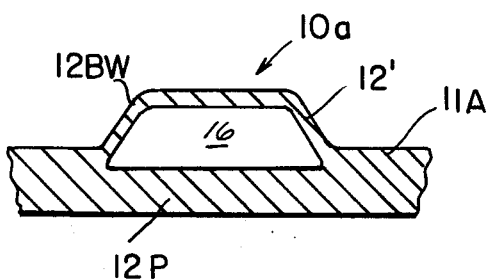

In the drawings:

FIG. 1 is an isometric view of part of a ducted panel made in accordance with the teachings of the instant invention, FIG. 2 is a side view of a modified form of the panel shown in FIG. 1 and FIG. 3 is an end view in cross section of still another modified form of ducted panel producible in accordance with the teachings of the instant invention.

There is shown in FIG. 1 a fragment of a ducted panel or sheet 10 having structural features which permit it to be used for a variety of purposes including electrical applications. The panel 10 is made of base sheet 11 which is fabricated of at least two sheets of material such as ceramic material or clear glass or metal capable of being heat softened and also roll bonded together. So called roll bonding techniques for forming vein-like conduit or duct formations in a sheet of metal are described in my said parent applications and in U.S. Pat. 2,662,273 wherein strips of stop-weld material are deposited or printed on one sheet prior to bringing said one sheet into engagement with a second sheet of metal and thereafter the two sheets are passed through a rolling mill and molecularly bonded together save in the areas thereof containing said stop weld material. The non-welded areas of the rolled sheet defined by stop weld materials are thereafter pressurized usually with hydraulic fluid until they expanded outwardly from the sheet forming expanded vein-like ducting or conduits in the panel.

The sheet or panel 11 of FIG. 1 is expanded to form one or more vein-like conduits 13 therein defined by one or more deformed or distended wall portions, one of which 15 is shown in the drawing while the opposite portion 14 of the conduit wall remains flat to form a passageway 16 extending through the sheet 11 between flat portions 12 of the sheet on both sides of said conduit portion. The passageway 16 may, for example, be filled with a gas such as neon or argon or mercury vapor which is entrapped in said conduit by deforming the ends thereof or by means of plugs 17 provided at both ends of the conduit. The plugs 17, only one of which is shown in FIG. 1 may be made of glass, metal or plastic such as epoxy or other suitable resin filling the end of the duct and sealingly engaging the walls 15 and 16 thereof. Extending through the plug or closure 17 is an electrical wire or pin 18 which may be connected to a suitable source of electrical energy for electrically energizing the gas in the passageway 16 in the sheet to generate, for example, the phenomena of fluorescence or luminescence along the passageway, when the opposite electrode down the tube is in the same series energizing circuit with wire 18 or is grounded.

By printing suitable stop-weld material in the desired pattern or strip-like configuration on one of the two sheets used to form the unexpanded sheet 11, the conduit 13 may be formed in the configurations of letters, numbers, figures, scenes, abstract display patterns and the like to form signs composed of bends of light generated when the gas in said conduit or conduits so formed, when the sheet is expanded as described herein. The flat portions 12 of the sheet 11 may be painted with opaque paint or otherwise decorated or masked to give the desired optical effects, or to mask said flat portions. Said flat portions or the border portions thereof may be fastened to a frame or other support for the panel or sign and may also serve to support the wires, leads or flat deposited circuit elements extending to the wires 18 at the ends of the conduit or conduits formed in the sheet.

In FIG. 2 a ducted panel of the type shown in FIG. 1 is provided in which the closure plugs 17 have been eliminated by deforming the ends of the conduit formation in the panel against the base sheet or by completely buckling or pinching the ends of the conduits closed while in a softened condition so as to seal same with the gas or fluid entrapped therein. If the material comprising the panel is glass, the ends of the conduit portions may be separately pinched closed in a manner to seal off said conduit as shown with the wire or pin 18 sealed in each end by being sandwiched between said end walls as they are pinched closed. The pinch-deformed portions of the wall 15 and the opposite wall 14 of the conduit may completely support the wire or pin 18 or auxiliary means such as a plug of glass or metal may be provided in the passageway before deforming said walls thereof.

Suitable stop-weld materials for heated metal or ceramic panels may comprise those defined in my said patent applications or the mentioned prior art, such as graphite or carbon in a suitable carrying agent such as printable resins which may be silkscreened or roller printed on one of the sheets to be roll bonded to form the panel while at ambient or elevated temperature such as that required to roll bond the sheets. If glass having a melting temperature in the range of 600 to 1000 degrees centigrade is used for the sheets to be roll-bonded, then powdered ceramic material such as powdered silica glass having a melting point in the range of 1600 degrees centigrade may be used for the stop weld material. Strips of non-meltable ceramic or metal may also be provided to serve as the stop weld material on selected areas of the sheet to be roll-bonded to form the composite sheet. Metal or ceramic tubing or conduit constituting metal sheet of the type illustrated may also be disposed between the two ceramic or glass sheets to be formed into the conduit containing panel for forming the core of said panel and all or selected portions of said metal such as the conduit portions thereof may be removed by passing an etchant liquid therethrough after the panel 10 is assembled therewith by deforming the two heated and softened sheets thereabouts.

Methods for producing conduit containing sheets or panels of the types described are noted as follows:

(I) In a first method, suitable so called stop-weld material such as pyrolitic or other forms of graphite, ceramic materials of higher melting temperature than the material of the sheets to be formed, metal powder or other materials disposed in a suitable binder such as silica jel or sodium silicate, resin or the like is sprayed or printed on a sheet of ceramic, glass or metal to be roll-bonded. When the stop-weld material is applied in a desired conduit defining pattern to said sheet, the sheet may be at ambient temperature and heated thereafter to be desired degree of workability or softness or may be at elevated temperature up to and including the temperature at which it is to be formed. Thereafter the surface of said sheet containing said deposited stop-weld material is disposed against another sheet of the same or different material and is compressed in a press or between rollers to bond or fuse those areas which are not printed or deposited with stop-weld material. A suitable fluid is then injected thru an edge opening to the composite bonded sheet material into the strip-like non-welded volume or volumes defined by the step-weld material to expand either or both the wall portions of the composite sheet outwardly to form the so called vein-like conduit formations therein. The expansion fluid may comprise a heated liquid such as a molten salt or molten liquid or a gas such as helium, argon, neon, carbon dioxide, hydrogen or other gas, which may be injected under controlled pressure into the strip-like non-welded volume between the surfaces of the composite sheet while the other end of the volume is pinched closed or closed off by virtue of extending the stop-weld material a degree short of the edge of the composite sheet. If the sheet material is allowed to expand freely without restriction under controlled fluid pressure, both portions 14 and 15 of the sheet material adjacent the non-welded strip-like volume to which fluid pressure is applied with outwardly distend or inflate providing a conduct contour as indicated by notations 15 and 14' in FIG. 1. If one surface of the sheet 11 is held against a flat platen during expansion, it will remain flat as indicated by surface 12' in FIG. 1, a configuration permitting the composite panel 10 to abut flatly against a supporting member or surface. Upon removal of the inflation nozzle from the edge opening to the conduit portion of the sheet, the closure plug 17 may be inserted and sealed inside the end of the conduit formation either while the sheet 11 is at temperature and capable of being heat sealed to the plug by applying sealing dies the walls of the conduit formation or after it has been allowed to cool, sealing thereafter being effected by reheating the plug and that portion of the panel to which it is to be sealed or by suitable sealing material applied at the necessary temperature to the plug and panel or sheet.

In a particular form of the method defined above, the wire 18 may comprise a tube attached to or forming part of the plug 17 which plug or tube is inserted into the edge opening of the sheet and used for inflating same as described while the wall portions at the end of the conduit formation are held against the end of the tube by suitable clamping means such as reciprocating dies applied to opposite faces of said sheet. The tube may thus be sealed in place and its outer end closed or sealed after the desired gas or liquid is injected into the conduit formation 13. The same fluid such as argon, neon, mercury vapor or other gas or liquid used to fill the passageway 16 during operation of the panel 10 may also be that which is used to inflate the panel to form the conduit 13 and may be entrapped therein as described under suitable pressure which may be the same pressure applied to inflate and form the conduit or a lower pressure. The gas may also be sealed at a higher pressure than that used to expand the panel after the temperature of the material has been reduced sufficiently to prevent further expansion or stretching of the material by gas pressure.

In another form of the invention employing the first described method of forming the panel, one or more strips of electrically conducting material such as metal in sheet, powdered or film form may be deposited or otherwise applied to the surface of either or both sheets used to form the panel either under or above the stop-weld material along a portion or the length of the inside wall of what eventually becomes conduit formation 13 to serve as an electrode or electrodes within the sheet for electrically energizing gas or other fluid trapped within the conduit when connected to a source of suitable electrical energy. Suitable coupling means such as pins 18 or other means may be assembled or otherwise applied to engage and conduct electrical energy relative to said deposited conducting material.

(II) In a second method for forming the panels herein described, opposing dies or a die and a flat platen may be applied to opposite faces of the flat composite sheet 11 just prior to expansion with at least one of said dies having a channel formed in its surface aligned with an conforming to the stop-weld material containing portions of the panel with the walls of said channel serving to limit and define the degree of deformation of the portions of the panel defining the conduit formation.

(III) In a third method of forming the panels herein described, a sheet of unexpanded so called roll-round metal is disposed against a first sheet of heat exypandable material either prior to or after it has been heated to softness as described for forming. A second sheet of said heat deformable or softenable material such as a glass or ceramic, is placed against portions of the first sheet and the upper surface of said roll-bonded material. The first and second outer sheets are then fused or bonded together and while at softening temperature, the inner sheet is inflated by suitable fluid pressure applied to its non-welded interfacial strip-like volume or volumes to inflate same and to force portions of the sheet defined by the outer sheets outwardly to conform to the inflated portions of the inner sheet. The inner sheet may be retained in place during use of the composite panel or may be removed by passing a suitable etchant liquid or vapor through it conduit formations to dissolve and remove same from the areas of the conduits formed in the outer sheets or panel.

Said third method may include securing said metal roll-bond sheet to one of the two glass or ceramic sheets used to form the new panel and etching away those portions of the metal sheet which do not contain conduit forming metal so that when the outer sheets of glass or ceramic are welded together thereafter prior to expansion, only the conduit forming portions of the metal sheet will remain between the outer sheets permitting the metal to be completely dissolved from between the outer sheets as described by etchant. Suitable copper or aluminum tubing bent to the desired configuration may also be disposed between the two glass or ceramic sheets to serve as dissolvable means for forming the channels or conduits in the final panel.

(IV) In a fourth technique, either or both the sheets of glass or ceramic material used to form the panel sheet 11 may be formed in a mold or die or respective molds or dies after which bonding, welding, or otherwise, joining of the two sheets is effected when they are properly aligned to form the described articles, or electrical panels. Mechanical die pressing means, vacuum and/or positive fluid pressure means may be used to form the walls of the desired conduit formations in either or both sheets against the walls of the die or mold. By aligning said deformed sheet containing die or mold with a second sheet of properly heated material or a die or mold containing said second sheet, the flat portions of the two sheets may be brought together and compressed between said dies or molds to effect suitable welding of said sheets to form the panel 11. In other words, the flat faces of the two sheets abut the flat outer faces of the two dies or molds and may be compressed thereby together to fusion bond the sheets together and form the described conduit containing panel. The electrodes and or plugs may be inserted prior to the described bonding procedure or may be applied and sealed in place thereafter.

In FIG. 3 is shown a section of a conduit containing sheet of metal, ceramic or glass panel 10a which is formed with one side flat without the need to resort to dies to effect said flat side formation. The sheet is roll bonded of a base sheet portion 12P provided originally as a sheet of greater thickness than the second sheet roll bonded thereto and defined in part in the drawing by the upper wall 12BW of the conduit 12' formed in the composite sheet 10a.

By fabricating the sheet 10a as illustrated with one of the two sheet materials from which it is rolled to shape being thicker than the other, a number of improvements are derived. In addition to permitting it to be inflation formed with one side flat as shown without the need for auxilliary dies or molds described as above, sheets having a total relative thickness and strength which is substantially greater than conventional roll-bond sheet materials may be formed without resorting to excessively high fluid pressures to expand the sheet with its conduit formations. In other words, if a sheet were fabricated by the conventional roll-bond technique employing two sheets of equal thickness to form the panels, and said two sheets were to have a total combined thickness of that shown in FIG. 3, then it would require substantially greater fluid pressure to expand the duct formations therein due to the necessity of expanding material of greater thickness than the portions defined by notation 12'. As a result, ducted panels formed by conventional roll bonding means have been limited in total thickness and rigidity to the combined thickness of the materials comprising the walls of the duct or conduit formations therein.

The structure shown in FIG. 3 may be applied to constructions requiring substantial strength in the ducted panel itself such as the walls of pressure vessel, aircraft structures and large heat exchangers. It may also be used for forming flat sign panels of the types described.

The improved physical characteristics are attained by fabricating the original panel 10, from which the ducts are formed by inflation of wall portions thereof, of a third sheet of roll-bondable metal the thickness of 12–BW and fusing this to a heavier sheet of metal the thickness of 12P. The non-fused duct volumes 16' are provided between the two sheets by provision of the mentioned friable material on one of the sheets prior to said fusion. The thinner sheet if fabricated of metals such as aluminum, copper, titanium or their alloys is preferably in the order of $1/64$ to $3/32$ inches in thickness while the heavier sheet may be $1/16$, $1/8$, $1/4$ inches thick or greater. It is also noted that the second sheet need not necessarily be a flat sheet but may be an extruded panel, structural member or plate of any desired shape which is a cast or molded member provided in a shape having a limited strip volume void of metal or interface which is extrusion cast formed therein and is so positioned that a duct may be formed thereof by inflation of the adjacent cast or extruded metal by application of internal pressure without deforming the base or other side of said non-fused area.

(b) Another fabrication technique involves the so-called Tube-in-Strip process which has been previously described as involving the insertion of strips of friable material into the billet from which the final panel or sheet is rolled which are chemically inert and provide said non-fused interfacial volume when said billet is rolled into sheet. The embodiment of FIG. 3 may be fabricated by so placing said friable strips in said billet and rolling in a manner that the interfacial, non-fused area will be formed say two thirds the distance from one surface of said finished sheet or at such a location in said sheet that when fluid pressure is applied to said non-fused interfacial volume it will deform sheet material from fused only one surface thereof without deforming the other material adjacent the other surface. The strips of friable material are thus provided in the original billet in locations which are closer to one wall of said billet than the other. The exact locations of said strips prior to rolling will depend on the cross sectional area of the billet, the degree to which it is rolled to make the plate or sheet and the desired thickness of the bulged and non-bulged walls of the duct or ducts to be formed therein.

Additional advantages to be derived from a duct panel of the type illustrated in FIG. 3 are described below:

(a) By providing the non-fused interfacial volume close enough from one surface of the panel or sheet, the duct wall 12–BW may be bulged outward by inflation and formed without deformation of the opposite duct wall 12P without the need for restraining the surface of 12P from movement by abutment against a surface of a bucking member.

(b) Heavy panels may be inflated rapidly whereby the governing factor will not be the total thickness of the panel but the thickness of the wall 12–BW. A heavier and stronger panel may be attained than the conventional panel inflated by air. Thicker panels may also be attained than by conventional methods.

(c) The resulting heavier walled panels may be machined or otherwise fabricated in manners not attainable for the conventional integrally formed ducted panels. For example, the fused sheet areas 11 may be milled, etched, drilled, threaded, shaped and formed to degrees and in manners not attainable with the conventional thinner panels. They may be welded, heat treated and formed in manners not feasible when using the conventional roll-bonded panel.

(d) The additional structural strength derived from the improved panel 10a of FIG. 3' as a result of greater structural strength of the heavier wall thickness has been mentioned and provides advantages such as greater stiffness, greater protection to the duct against penetration, use as a support per se (i.e. in monocoque body or wing construction), ability to withstand greater temperatures without danger of melting, use for shielding, ability to support other objects, structures, assemblies, etc. In short, the panel provides a variety of new uses and applications not feasible with the conventional panel of this type.

(e) The dashed lines in FIG. 3' define a panel structure having application as a ducting device for high pressure fluids, that is pressures which are higher than normally carried by the conventional roll-bonded ducted panel having a conduit formation with a wall thickness in the order of that of wall 12–BW. A material solidified in situ or panel 10b is provided in abutment with the duct wall 12–BW and the adjacent surfaces of 11a. The panel 10b may be a solid plate of metal machined or shaped to the contour illustrated (i.e. abutting the surface of the duct wall 12–BW and the other surface portions of 11a. Member 10b may be secured to panel 10a by rivets or bolts passing through the two in the areas 11a, by adhesive means or may be welded or fused therewith. Because of the heavier thickness of the wall 12P, it may be used per se without support for restraining higher pressures generated in 16' then attainable in conventional ducted panels formed in the manner described. Member 10b supports wall 12–BW against bursting or rupture permitting wall to resist higher pressures than ordinarily experienced in integrally formed conduits provided in sheet metal by the means described in Pat. 2,652,275. Member 10b may also be polymeric material such as polyester or epoxy resins reinforced with glass fibers or the like and cast or molded in situ on the base panel. It may also comprise other materials which are cast, extruded, sprayed or otherwise provided in situ on either or both surfaces of the panel 10A.

It is noted that a number of variations in the constructions of FIGS. 1 and 2 are possible. For example, a panel, container or component made thereof may be provided with multiple vein-like ducts or ducting systems formed integrally therein each or certain of which are not interconnected with the others which are provided to serve different functions. A panel or sheet may be provided, for example, having a conduit formed therein in circuit with a fluid supply system for the circulation of a heat transfer fluid therethrough which panel also has one or more similar duct formations provided for reinforcing said panel per se or for insulation or vibration isolation purposes and hence are not interconnected to the fluid carrying duct or circuit. The reinforcing ducts may be provided per se or may contain a solidified reinforcing member or material as described. One or more ducts may also be provided adjacent to one or more fluid carrying ducts containing a fluid sealed therein for refrigeration or insulating purposes. For example, a duct circuit may be operative for flowing a refrigerant in a fixed path in a refrigerator or air conditioner and may also contain a separate conduit formation to said refrigerant and helps maintain the temperature of the volume enclosed by the panel constant when heat transfer fluid is not flowing through the adjacent duct.

Another arrangement includes the provision of a panel, sheet or component having multiple ducts or ducting systems formed therein, one of which contains a liquid such as a refrigerant, an adjacent duct containing a fluid such as a gas in a circuit and moveable in a path adjacent said refrigerant containing duct to be cooled thereby prior to its circulation through an enclosure such as a refrigerator after being so cooled. In another arrangement, a ducted sheeting or component containing a duct for flowing a hot or cold fluid therethrough is provided in a sheet adjacent a second duct formed therein and containing a liquid such as a lubricant or fluid which is cooled or heated by said cold or hot fluid and therefore provided at the exhaust end of said duct constant or predetermined physical condition. For such an embodiment the two duct formations are preferably formed in the sheet 10 in closer spacing then illustrated in FIG. 1. The liquid being heated or cooled may be circulated in a duct 12 which is formed between two similarly shaped ducts on both sides thereof each of which contains said cooling or heating liquid. To effect such fluid cooling or heating, two panels 10 may be provided in abutment together with their non-deformed surfaces abutting each other and with the ducts of one immediately adjacent the ducts of the other so that a heated or cooled liquid in one may be used to heat or cool a liquid in the matched adjacent duct of the other sheet. The same effect may be attained by fabricating the ducted panel 10' of FIG. 1 by the Roll-Bond method of three sheets, the center sheet remaining non-deformed and dividing or partitioning the duct interior 16' into two chambers one of which may be used for the heating or cooling liquid or gas and the other containing the liquid to be heated or cooled.

In another variation, a panel or component which contains ducted formations as described certain of which contain the described materials (viz: one containing a fluid flowing therethrough for heat transfer purposes, and others containing an electrical conducting element, a third containing a liquid such as a brake fluid, oil, fuel, while others contain reinforcing materials or elements such as 14, 14' for enhancing the strength of said panel).

It is noted that the methods described hereinbefore for fabricating sheet metal by expanding same to form vein-like ducting therein may be modified whereby other sheet materials such as ceramic, glass, plastics and certain metals or combinations of these materials formed by laminating sheets thereof which will not easily inflate or plastically deform at room temperature. Such modified procedures may involve rendering the sheet material plastic or more plastic than when at room temperature by heating same to render it soft or semi-molten and, while in such plastic condition, applying the necessary fluid pressure to strip-like voids provided within the sheet by means of stop weld material or the like to inflate or bulge the sheet material to form said vein-like ducting or conduct therein.

Heat exchanger panels may be fabricated of ceramic, glass, metal or plastic or laminates thereof by the procedures described including the intermediary step of heating the sheet or plate to a plastic or semi-molten condition or providing such state and working the sheet, as or immediately after it is formed in said condition with the non-fused interfacial strip areas provided between the major surfaces of the sheet. While still at elevated temperatures and in a plastic condition, a fluid such as air or a gas is injected through an inflation nozzle inserted prior to or after heating the panel, at a pressure to inflate the plastic or semi-molten sheet to form a vein-like conduit therein.

If a glass or ceramic such as Pyroceram is employed as the material of which the sheet is made, two sheets thereof may be hot rolled together with a stop-weld material such as graphite, metal foil, etc. printed or otherwise disposed between the sheets to prevent fusion of the desired interfacial strip areas which sheet is thereafter inflated to form a conduit or conduits thereof. In a particular application, the non-fused interfacial strip-like volume in the sheet may be contoured to represent indicia, alpha-numeric characters or the like and may form one or more conduits in transparent glass for fabricating neon signs, displays and the like. The inflation fluid may therefore comprise an inert gas such as neon, argon or mercury vapor which may be sealed within the vein-like conduit after inflation by inserting one or more pairs of plugs in edge openings of said conduit, said plugs containing electrodes and means for connecting electrical wires thereto for electrically energizing or exciting the gas to fluoresce or emit light; and sealing said plugs to the walls of the vein-like conduit. Such sealing may be effected by welding or bonding the semi-molten glass, preferably after compressively deforming the edge portions of the conduit walls against the plugs while said sheet is in a plastic or semi-molten state. If the sheet is to be utilized as a lighted display or sign, the non-expanded flat areas thereof between the vein-like conduit formed therein may be masked or made opaque (if necessary by, for example, spraying or otherwise applying paint or the like thereto. However, portions of or the entire area between the conduit portions may be retained transparent or translucent to derive various optical effects therefrom.

Upon completion of such a display sheet, it may be hung or supported from below per se or secured in a frame and utilised as a sign or display.

In another form of the invention, an intense radiation beam such as that generated by an electron gun or laser, may scan the entire sheet or substantially just the area or areas thereof desired to be inflated or otherwise formed or shaped so as to heat same to a plastic or semi-molten state whereby it may be easily worked such as expanded as described or otherwise, formed into an article of defined shape. Motor means operative to position the beam gun and/or laser device or the support for the sheet or material being heated to said plastic or semi-molten condition may be predeterminedly controlled by a program control means such as a reading means for tape or punched card or a multi-circuit timer to cause the beam or beams to scan predetermined areas of the material being irradiated for heating same to a plastic or softer condition along selected portions thereof which may be distended or deformed by the means herein described or by other means along the area or areas so softened such as bending means, pressing means, spinning means or other means applying forces to the plastic portion(s) of the sheet by engaging said portions and/or adjacent portions of the sheet. Conventional or modified bending brakes, stretch forming presses, die presses, rolling means, spinning means, blanking means or other form of sheet working means may be operated to deform the sheet or other shape made soft or plastic by beam scanning and may be automatically controlled to perform such deforming operation in a cycle which is controlled by the same program controller which controls said beams scanning to heat said selected area or areas of the material. Further means may also be applied as scanning occurs or immediately thereafter to mechanically, hydraulically, pneumatically or otherwise shape or remove material from the volume of said material so heated by the intense laser or electron beam, and the application of said further means may be controlled by the same program controller controlling the beam scanning means. If the sheet or other shaped being formed as it is heated by the beam(s) is secured to a rotatable fixture, it may be spun, machined or otherwise formed by a tool or tools brought to bear against the area heated as or immediately after it attains its soft, plastic or semi-molten condition, in other words, the apparatus is operative to provide coordinated and synchronized operation of both the beam scanning means and the tool operative to apply force to the work. The two may be fixed with respect to each other but movable with respect to the work or each may be independently movable by operation of respective servo devices. One or more of the tools may be cutting tools operative to remove material which has been heated as it is heated or immediately thereafter which tools may be rotated or otherwise driven against the work as the latter is moved or held stationary.

In another form of the invention, two sheets of the type described may be bonded or welded together save in areas thereof to be inflated or expanded or otherwise shaped by means of an intense radiation electron or laser beam or beams scanning selected areas of the sheets as or immediately before said sheets are compressed together between rollers. The beam(s) may be directed against the outer face or faces of both sheets just prior to entering the rolls or the inside face or faces of either or both sheets just prior to entering said rolls. If the sheets are brought together obliquely to the rolls, the beam or beams may also be operative to scan the entire or selected areas of both sheets as they abut each other by providing the scanning and beam generating means between the sheets a distance upstream of the rolls where the sheets are separated. In this manner the same or different sheet materials may be joined by welding or hot bonding by the intense heating of the abutting faces of the sheets just as they are brought together. Scanning the entire width of the converging or abutting sheets as they are brought together will result in welding the entire width thereof together while gating the beam on and off to apply intense heat to just selected portions of the scan may be utilized to weld just selected widths of the sheet which may be so controlled as to provide non-fused interfacial strip-like volumes in the resulting unitary sheet or panel which may be inflated or otherwise deformed as described.

Selective scanning by an intense radiation beam or beams of one or more of a plurality of sheets or other shapes being fed to the bite of a rolling mill may be utilized also to heat treat or soften selected areas of the sheet or sheets so that said selected areas may be more easily worked in the rolling mill or downstream thereof. Such working may comprise roll deforming, beading, stretching, grinding, machining, die forming or blanking, welding articles to the sheet or shape downstream of the rolling mill, slitting or cutting the sheet, finishing or coating same, etc. wherein a plastic, soft or semimolten condition is required of selected areas of the sheet to simplify or effect the desired result.

The hereinbefore described procedures may be utilized to fabricate heat exchanger panels and the like which are made of a sheet of metal and a sheet of ceramic or glass heat bonded together. Molten or semi-molten glass or ceramic materials may be applied to a surface of a sheet of metal which may have selected areas thereof heated to a temperature where the glass or ceramic will bond thereto in a press or rolling mill receiving the two materials to the exclusion of bonding the other areas not so selectively heated which unbonded areas may be inflated or otherwise worked to outwardly distend or otherwise form same.

I claim:

1. A method of fabricating an electrical light panel from a unitary sheet of material comprising:

forming a composite sheet-like panel by joining two sheets of material together, at least one of which sheets comprises a light transmitting material, and providing unjoined portions extending in a predetermined path between the major surfaces of said panel, heating at least the portions of said light transmitting material defining the unjoined portion of said sheet to heat soften same a degree whereby it may be fluidically deformed, fluidically permanently deforming said heat softened unjoined portion of said light transmitting material to cause it to bulge outwardly from the surface of said composite panel and to form an expanded passageway extending through said panel from an opening at an edge of said panel, disposing a light emitting material within said passageway and positioning an electrical conductor through said edge opening in said panel into said passageway with a portion of said conductor extending beyond the edge of said panel, sealing the edge opening to said passageway about said electrical conductor so as to secure said electric conductor to said panel and to seal off the passageway and retain said light emitting material within said passageway.

2. A method in accordance with claim 1 wherein one of said sheets is transparent glass which is fusion bonded to the other sheet except along the unjoined portion thereof within said panel.

3. A method in accordance with claim 1 wherein both said sheets are glass which are heat fused together except along the unjoined portion of said panel.

4. A method in accordance with claim 1 wherein the sealing is effected by disposing a filler material about said electrical conductor and sealing said filler material to said conductor and the wall of the passageway defining said edge opening thereto.

5. A method in accordance with claim 1 including sealing a second electrical conductor to said panel which second conductor also extends into said passageway and connecting the two conductors in series circuit with a source of electrical energy to cause said light emitting material to generate light when energized by said electrical energy transmitted thereto across said conductors.

References Cited

UNITED STATES PATENTS

| 2,494,857 | 1/1950 | Breadner et al. | 65—54 |
| 2,779,086 | 1/1957 | Rieppel et al. | 29—157.3 R |
| 2,933,634 | 4/1960 | Lederer | 65—59 X |
| 3,271,846 | 9/1966 | Buechele et al. | 29—157.3 R |
| 3,394,446 | 7/1968 | Valyi | 29—157 R |

ROBERT L. LINDSAY JR., Primary Examiner

U.S. Cl. X.R.

29—25, 18, 472.9; 65—59